(12) United States Patent
Coronato et al.

(10) Patent No.: US 8,312,769 B2
(45) Date of Patent: Nov. 20, 2012

(54) UNIAXIAL OR BIAXIAL MICROELECTROMECHANICAL GYROSCOPE WITH IMPROVED SENSITIVITY TO ANGULAR VELOCITY DETECTION

(75) Inventors: Luca Coronato, Corsico (IT); Gabriele Cazzaniga, Rosate (IT); Sarah Zerbini, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 408 days.

(21) Appl. No.: 12/626,442

(22) Filed: Nov. 25, 2009

(65) Prior Publication Data

US 2010/0126272 A1    May 27, 2010

(30) Foreign Application Priority Data

Nov. 26, 2008  (IT) .............................. TO2008A0877

(51) Int. Cl.
*G01C 19/56*   (2006.01)
(52) U.S. Cl. .................................. 73/504.04; 73/504.12
(58) Field of Classification Search ............. 73/504.04, 73/504.12, 504.14, 504.32, 514.29
See application file for complete search history.

(56) References Cited

U.S. PATENT DOCUMENTS

| | | | |
|---|---|---|---|
| 5,728,936 A | 3/1998 | Lutz | 73/504.14 |
| 5,895,850 A | 4/1999 | Buestgens | |
| 6,230,563 B1 | 5/2001 | Clark et al. | 73/504.04 |
| 6,250,156 B1 | 6/2001 | Seshia et al. | |
| 6,349,597 B1 * | 2/2002 | Folkmer et al. | 73/504.02 |
| 6,520,017 B1 * | 2/2003 | Schoefthaler et al. | 73/514.02 |
| 8,042,394 B2 * | 10/2011 | Coronato et al. | 73/504.04 |

(Continued)

FOREIGN PATENT DOCUMENTS

DE    102007012163    10/2007

(Continued)

OTHER PUBLICATIONS

Schofield, A.R. et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

(Continued)

*Primary Examiner* — Helen C. Kwok
(74) *Attorney, Agent, or Firm* — Seed IP Law Group PLLC

(57) ABSTRACT

An integrated microelectromechanical structure is provided with: a driving mass, anchored to a substrate via elastic anchorage elements and moved in a plane with a driving movement; and a first sensing mass, suspended inside, and coupled to, the driving mass via elastic supporting elements so as to be fixed with respect to the driving mass in the driving movement and to perform a detection movement of rotation out of the plane in response to a first angular velocity; the elastic anchorage elements and the elastic supporting elements cause the detection movement to be decoupled from the driving movement. The elastic supporting elements are coupled to the first sensing mass at an end portion thereof, and the axis of rotation of the detection movement extends, within the first sensing mass, only through the end portion.

27 Claims, 9 Drawing Sheets

U.S. PATENT DOCUMENTS

| | | |
|---|---|---|
| 2002/0183899 A1 | 12/2002 | Wallner ............................ 701/1 |
| 2002/0189351 A1 | 12/2002 | Reeds et al. |
| 2002/0189352 A1* | 12/2002 | Reeds et al. ............... 73/504.04 |
| 2002/0189353 A1 | 12/2002 | Knowles et al. |
| 2003/0164040 A1 | 9/2003 | Willig et al. |
| 2004/0211257 A1 | 10/2004 | Geen ......................... 73/504.04 |
| 2004/0211258 A1 | 10/2004 | Geen |
| 2005/0050954 A1 | 3/2005 | Chaumet et al. .......... 73/504.12 |
| 2005/0229703 A1 | 10/2005 | Geen et al. |
| 2006/0032310 A1* | 2/2006 | Merassi et al. ............ 73/514.35 |
| 2006/0112764 A1* | 6/2006 | Higuchi ..................... 73/504.12 |
| 2006/0272411 A1 | 12/2006 | Acar et al. |
| 2007/0214883 A1* | 9/2007 | Durante et al. ............ 73/504.04 |
| 2007/0289382 A1 | 12/2007 | Caminada et al. |
| 2008/0190200 A1 | 8/2008 | Caminada et al. |
| 2008/0276706 A1 | 11/2008 | Hartmann et al. ......... 73/504.04 |
| 2009/0064780 A1 | 3/2009 | Coronato et al. |
| 2009/0100930 A1 | 4/2009 | Coronato et al. |
| 2010/0126269 A1 | 5/2010 | Coronato et al. .......... 73/504.04 |
| 2010/0132463 A1 | 6/2010 | Caminada et al. ......... 73/504.12 |
| 2010/0154541 A1* | 6/2010 | Cazzaniga et al. ......... 73/504.12 |
| 2010/0186507 A1 | 7/2010 | Günthner et al. |
| 2010/0281977 A1 | 11/2010 | Coronato et al. .......... 73/504.14 |

FOREIGN PATENT DOCUMENTS

| | | |
|---|---|---|
| DE | 102006046772 A1 | 4/2008 |
| EP | 1619471 A1 | 1/2006 |
| EP | 1624286 | 2/2006 |
| EP | 1832841 A1 | 9/2007 |
| JP | 2005/241500 | 9/2005 |
| WO | 2006/043890 | 4/2006 |
| WO | 2007086849 A1 | 8/2007 |
| WO | 2007/145113 | 12/2007 |
| WO | 2009/033915 | 3/2009 |
| WO | 2009/087858 | 7/2009 |

OTHER PUBLICATIONS

Cazzaniga, G. et al., "Integrated Microelectromechanical Gyroscope With Improved Driving Structure," U.S. Appl. No. 12/975,979, filed Dec. 22, 2010, 34pgs.

* cited by examiner

UNIAXIAL OR BIAXIAL MICROELECTROMECHANICAL GYROSCOPE WITH IMPROVED SENSITIVITY TO ANGULAR VELOCITY DETECTION

BACKGROUND

1. Technical Field

The present disclosure relates to a microelectromechanical structure, in particular a uniaxial or biaxial gyroscope, provided with an increased sensitivity to detection of angular velocities, in particular angular velocities of pitch and roll.

2. Description of the Related Art

As is known, micromachining techniques enable manufacturing of microelectromechanical structures or systems (MEMS) within layers of semiconductor material, which have been deposited (for example, a polycrystalline-silicon layer) or grown (for example, an epitaxial layer) on sacrificial layers, which are removed via chemical etching. Inertial sensors, accelerometers, and gyroscopes provided with this technology are encountering an increasing success, for example, in the automotive field, in inertial navigation, or in the sector of portable devices.

In particular, integrated gyroscopes are known, which are made of semiconductor material and obtained with MEMS technology. These gyroscopes operate on the basis of the theorem of relative accelerations, exploiting the Coriolis acceleration. When an angular velocity is applied to a mobile mass moving at a linear velocity, the mobile mass "feels" an apparent force, referred to as Coriolis force, which determines a displacement thereof in a direction perpendicular to the direction of the linear velocity and to the axis about which the angular velocity is applied. The mobile mass is supported via springs that enable its displacement in the direction of the apparent force. Based on the Hooke's law the displacement is proportional to the apparent force, so that the Coriolis force, and the value of the angular velocity that has generated it, can be determined from the displacement of the mobile mass. The displacement of the mobile mass can, for example, be detected in a capacitive way, determining, in resonance conditions, capacitance variations caused by the movement of mobile electrodes, fixed with respect to the mobile mass and combfingered with fixed electrodes.

The published U.S. patent applications U.S. 2007-0214883, U.S. 2009-0064780, and U.S. 2009-0100930, filed by the applicant of the present application, disclose an integrated microelectromechanical sensor with a rotary driving movement and sensitive to angular velocities of pitch, roll, and yaw about respective axes of detection.

This microelectromechanical sensor comprises a single driving mass, anchored to a substrate in a single central point, and actuated with rotary motion about an axis passing through the central point and orthogonal to the plane of the driving mass. The rotation movement of the driving mass makes it possible to obtain in the plane of the mass two components of driving velocity, orthogonal with respect to one another. Through openings are provided within the driving mass, and corresponding sensing masses are arranged within the through openings; the sensing masses are enclosed in the overall dimensions of the driving mass, are suspended with respect to the substrate, and are connected to the driving mass via flexible elements. Each sensing mass is fixed with respect to the driving mass during its rotary motion, and moreover has a further degree of freedom of movement as a function of an external stress, in particular a Coriolis force, acting on the sensor. The flexible elements, thanks to their particular construction, enable the sensing masses to perform a rotary movement of detection about an axis belonging to the plane of the sensor, or alternatively a linear movement of detection along an axis belonging to the plane of the sensor, respectively, in response to a Coriolis acceleration acting in a direction perpendicular to the plane and to a Coriolis acceleration acting in a direction belonging to the plane. The detection movement is in any case substantially decoupled from the actuation movement of the driving mass. This microelectromechanical structure, in addition to being compact (in so far as it envisages a single driving mass enclosing in its overall dimensions a plurality of sensing masses), makes it possible to obtain with minor structural modifications, a uniaxial, a biaxial, or a triaxial gyroscope (and/or possibly an accelerometer, according to the electrical connections implemented), at the same time ensuring an excellent decoupling of the driving dynamics from the detection dynamics.

FIG. 1 shows an exemplary embodiment of a biaxial microelectromechanical gyroscope, designated by 1, according to the teachings disclosed in the aforesaid patent applications.

The gyroscope 1 is provided in a die 2 comprising a substrate 2a made of semiconductor material (for example, silicon), and a frame 2b; the frame 2b defines inside it an open region 2c, overlying the substrate 2a, and designed to house detection structures of the gyroscope 1 (as described in detail hereinafter). The open region 2c has a generally square or rectangular configuration in a horizontal plane (in what follows, plane of the sensor xy), defined by a first horizontal axis x and a second horizontal axis y, fixed with respect to the die 2. The frame 2b has sides substantially parallel to the horizontal axes x, y. Contact pads 2d (so-called "die pads") are arranged along a side of the frame 2b, aligned, for example, along the first horizontal axis x. In a way not illustrated, the die pads 2d make it possible to electrically contact from the outside the detection structures of the gyroscope 1. The die pads 2d have an axis of symmetry, in this case coinciding with the second horizontal axis y (orthogonal to their direction of alignment), being arranged in equal number and in a specular way on opposite sides of the second horizontal axis y.

In particular, the first and second horizontal axes x, y correspond to a first axis of detection and a second axis of detection of the gyroscope 1 (more precisely, to a pitch axis and to a roll axis), about which corresponding angular velocities $\vec{\Omega}_x$ (pitch angular velocity) and $\vec{\Omega}_y$ (roll angular velocity) are detected.

In detail, the gyroscope 1 comprises a driving structure, housed within the open region 2c and formed by a driving mass 3 and by a driving assembly 4.

The driving mass 3 has a generally circular geometry with radial symmetry, having a substantially planar configuration with main extension in the plane of the sensor xy, and negligible dimension, with respect to the main extension, in a direction parallel to a vertical axis z, forming with the first and second horizontal axes x, y a set of three orthogonal axes, fixed with respect to the die 2. For example, the driving mass 3 has in the plane of the sensor xy basically the shape of an annulus, and defines at the center an empty space 6, the center O of which coincides with the center of gravity and the center of symmetry of the entire structure.

The driving mass 3 is anchored to the substrate 2a by means of a first anchorage 7a placed at the center O, to which it is connected through first elastic anchorage elements 8a. In the example, the first elastic anchorage elements 8a extend, forming a cross, from the center O parallel to the first and second horizontal axes x, y. The driving mass 3 is anchored to the substrate 2a by means of further anchorages 7b, set on the outside of the same driving mass 3, to which it is connected by means of further elastic anchorage elements 8b. For example, the further elastic anchorage elements 8b are of the folded type, are four in number, and are aligned in pairs along the first and second horizontal axes x, y, in such a way that the further anchorages 7b are set, in pairs, on opposite sides of the driving mass 3 with respect to the empty space 6, at the vertex of a cross centered in the center O. The first and further elastic anchorage elements 8a, 8b enable a rotary movement of the driving mass 3 about a driving axis passing through the center O, parallel to the vertical axis z and perpendicular to the plane of the sensor xy.

The driving mass 3 has: a first pair of through openings 9a, 9b, aligned in a diametric direction along the first horizontal axis x (pitch axis), and set on opposite sides with respect to the empty space 6; and a second pair of through openings 9c, 9d, aligned in a diametric direction along the second horizontal axis y (roll axis), and set on opposite sides with respect to the empty space 6. In particular, each through opening 9a-9d has in the plane of the sensor xy the shape of a radial annulus sector, having arc-shaped internal and external sides and radially extending lateral sides. In addition, the through openings 9a, 9b of the first pair are symmetrical with respect to the second horizontal axis y, and the through openings 9c, 9d of the second pair are symmetrical with respect to the first horizontal axis x.

The driving assembly 4 comprises a plurality of driven arms 10, extending externally from the driving mass 3 in a radial direction and in such a way that they are set at equal angular distances apart from one another, and a plurality of first and second driving arms 12a, 12b, extending parallel to, and on opposite sides of, respective driven arms 10. Each driven arm 10 carries a plurality of first electrodes 13, extending perpendicular to, and on both sides of, the same driven arm. In addition, each of the first and second driving arms 12a, 12b carries respective second electrodes 14a, 14b, which extend towards the respective driven arm 10, and are combfingered with the corresponding first electrodes 13. The first driving arms 12a are set all on one and the same side of the respective driven arms 10, and are biased all at one and the same first potential. Likewise, the second driving arms 12b are set all on the opposite side of the respective driven arms 10, and are biased all at one and the same second potential. A driving circuit (not illustrated) is connected to the second electrodes 14a, 14b for applying the first and second potentials and determining, by means of the mutual and alternating attraction of the electrodes, an oscillatory rotary motion of the driving mass 3 about the driving axis, at a given frequency of oscillation.

The gyroscope 1 further comprises a first pair of acceleration sensors with axis parallel to the vertical axis z, and in particular a first pair of sensing masses 16a, 16b, set within a respective through opening 9a, 9b so as to be completely enclosed and contained in the overall dimensions of the driving mass 3 in the plane of the sensor xy. Each of the sensing masses 16a, 16b has a shape corresponding to that of the respective through opening, and consequently has, in plan view, the general shape of a radial annulus sector. In detail, each of the sensing masses 16a, 16b has a first portion 17, which is wider, and a second portion 18, which is narrower (along the first horizontal axis x) but has in any case dimensions comparable with those of the first portion 17, the two portions being connected by a connecting portion 19, which is shorter (in a direction parallel to the second horizontal axis y) than the first and second portions 17, 18, and consequently has a center of gravity G located within the corresponding first portion 17. In greater detail, the first portion 17 has an outer side that is arc-shaped and concave and lateral sides extending radially, and the second portion 18 has an outer side that is arc-shaped and convex and lateral sides extending radially, aligned along the lateral sides of the first portion 17. Each of the sensing masses 16a, 16b is supported by a pair of elastic supporting elements 20 extending from the connecting portion 19 to the driving mass 3, connecting thereto, parallel to the second horizontal axis y (the elastic supporting elements 20 extending consequently in an intermediate position with respect to the width of the respective sensing mass). The elastic supporting elements 20 extend within recesses 21 provided on opposite sides of the corresponding sensing mass 16a, 16b, at a distance $b_C$ from its center of gravity G. They form torsional springs rigid in regard to the rotary motion of the driving mass 3 (so that the sensing masses 16a, 16b follow the driving mass 3 in its driving motion), and also enable rotation of the sensing masses about an axis of rotation parallel to the second horizontal axis y and belonging to the plane of the sensor xy, and hence their movement out of the plane of the sensor xy (a movement that is not instead allowed to the driving mass 3).

The gyroscope 1 further comprises a second pair of acceleration sensors with axis parallel to the vertical axis z, and in particular a second pair of sensing masses 16c, 16d, housed within the through openings 9c, 9d, and completely enclosed and contained by the driving mass 3. The sensing masses 16c, 16d are obtained from the rotation through 90° of the sensing masses 16a, 16b with respect to the center O, and consequently the corresponding elastic supporting elements 20 extend parallel to the first horizontal axis x and enable rotation out of the plane of the sensor xy, about an axis of rotation parallel to the first horizontal axis x.

A pair of first and second sensing electrodes 22, 23 is set underneath the first and second portions 17, 18 of each of the sensing masses 16a-16d. The first and second sensing electrodes 22, 23 are polycrystalline-silicon regions formed on top of the substrate 2a and having a substantially trapezoidal shape and dimensions substantially the same as one another and corresponding to those of the second portion 18. The first and second sensing electrodes 22, 23 are separated, respectively, from the first and second portions 17, 18, by an air gap, and form, together with the first and second portions 17, 18 respective sensing capacitors. The first and second sensing electrodes 22, 23 of each sensing mass 16a-16d are connected in a differential way to a read circuit of the gyroscope 1 (not illustrated) via the connection pads 2d.

In use, the gyroscope 1 is able to operate as a biaxial gyroscope, and to detect a (pitch) angular velocity $\vec{\Omega}_x$ about the first horizontal axis x, and a (roll) angular velocity $\vec{\Omega}_y$ about the second horizontal axis y.

With reference also to FIG. 2, the rotary movement of the driving mass 3 and of the sensing masses 16a-16d about the driving axis can be represented by a driving-velocity vector $\vec{v}_a$, tangential to the circumference that describes the path thereof. In particular, the rotary motion about the first horizontal axis x or the second horizontal axis y with angular velocity $\vec{\Omega}_x$, $\vec{\Omega}_y$, causes a Coriolis force (designated by $\vec{F}_C$) acting on the entire structure, proportional to the vector product between the angular velocity $\vec{\Omega}_x$, $\vec{\Omega}_y$ and the driving velocity $\vec{v}_a$, and hence directed along the vertical axis z. On the entire structure, considered as a single rigid body, it is hence possible to identify a distribution of Coriolis forces, the value of which increases as the distance from the center O increases. The resultants of the Coriolis force $\vec{F}_C$ acting on the sensing masses 16a-16d at the corresponding center of gravity G, cause rotation of the same sensing masses, which move out of the plane of the sensor xy, about an axis parallel to the first horizontal axis x or the second horizontal axis y and passing through the first elastic supporting elements 20. This movement is enabled by the torsion of the first elastic supporting elements 20. Instead, the configuration of the first and further elastic anchorage elements 8a, 8b is such as to inhibit, to a good approximation, the movement of the driving mass 3 out of the plane of the sensor xy, in this way enabling the effective decoupling of the motion of detection of the sensing masses with respect to the driving motion. Displacement of the sensing masses 16a-16d out of the plane of the sensor xy causes the approach/moving away of the first portion 17 to/from the respective sensing electrode 22, and a corresponding moving away/approach of the second portion 18 from/to the respective sensing electrode 23. There follows a differential capacitive variation of the sensing capacitors associated to one and the same sensing mass and to sensing masses of one and the same pair, the value of which is proportional to the angular velocity $\vec{\Omega}_x$, $\vec{\Omega}_y$, which can hence be determined via a suitable read circuit operating according to a differential scheme.

In particular, given that the reading scheme is differential, the presence of a pair of electrodes 22, 23 for each of the sensing masses 16a-16d enables automatic rejection of linear spurious accelerations along the vertical axis z. In addition, a rotation about the first horizontal axis x is not felt by the second pair of sensing masses 16c, 16d, in so far as the resultant Coriolis force $\vec{F}_C$ is zero (since the vector product between the angular velocity $\vec{\Omega}_x$ and the corresponding driving velocity $\vec{v}_a$ goes to zero). Likewise, the rotation about the second horizontal axis y is not felt for similar reasons by the first pair of sensing masses 16a, 16b, so that the two axes of detection are not affected and are substantially decoupled.

The particular conformation of the sensing masses 16a-16d enables increase in the sensitivity of the gyroscope 1 (as compared to the use of other geometries for the same first sensing masses). In particular, the corresponding center of gravity G is positioned at a distance $b_C$ from the elastic supporting elements 20 (and from the corresponding axis of rotation out of the plane of the sensor xy) that is greater than that of the center of gravity of any rectangular mass that can be inscribed in one and the same sector of the driving mass 3 and is supported by elastic supporting elements extending along the same axis of rotation. Consequently, it is possible to obtain a higher torque and hence a greater movement of rotation out of the plane of the sensor xy, and in this way to obtain a higher sensor sensitivity.

In addition, the presence of the further elastic anchorage elements 8b, located outside the driving mass 3, enables increase of the stiffness of the driving mass 3 in regard to the movements out of the plane of the sensor xy, and hence increase of the decoupling between the driving movement and the detection movements.

Even though the gyroscope described represents a considerable improvement over known gyroscopes, it is not optimized from the standpoint of manufacturing simplicity and efficiency in terms of the corresponding electrical characteristics.

BRIEF SUMMARY

One embodiment is a microelectromechanical (MEMS) gyroscope that is improved in regards to sensitivity to angular velocities. In one embodiment of the present disclosure, an integrated MEMS structure is provided that includes a driving mass, anchored to a substrate via elastic anchorage elements, and designed to be moved in a plane with a driving movement. The MEMS structure also includes a first sensing mass, suspended inside, and coupled to, said driving mass via elastic supporting elements so as to be fixed with respect to said driving mass in said driving movement and to perform a detection movement of rotation out of said plane, in response to a first angular velocity, wherein said elastic supporting elements are coupled to said first sensing mass at an end portion thereof, an axis of rotation of said detection movement extends, inside said first sensing mass, only through said end portion.

BRIEF DESCRIPTION OF THE SEVERAL VIEWS OF THE DRAWINGS

For a better understanding of the present disclosure, preferred embodiments thereof are now described purely by way of non-limiting example and with reference to the attached drawings, wherein.

DETAILED DESCRIPTION

As will be described in detail hereinafter, an aspect of the present disclosure envisages providing a microelectromechanical gyroscope having a structural configuration such as to enable an increase in the sensitivity of the sensor and in general an improvement of its electrical characteristics.

Figure 3:
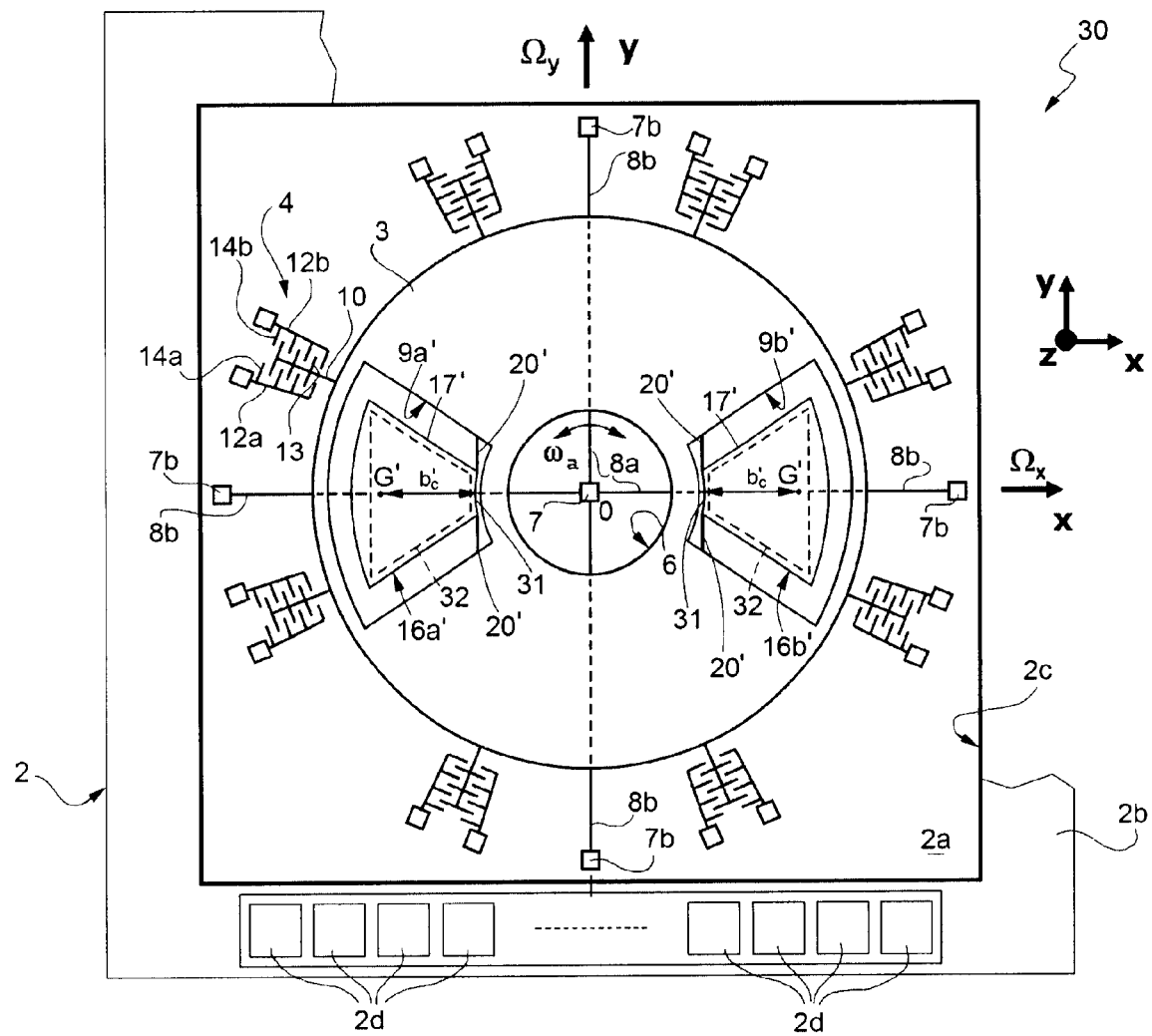
FIG. 3 shows a schematic top plan view of a microelectromechanical gyroscope according to a first embodiment of the present disclosure.

As is shown in FIG. 3, where the same reference numbers are used for designating elements similar to others already described with reference to FIG. 1, the microelectromechanical gyroscope, here designated by 30, differs from the gyroscope 1 of FIG. 1 substantially on account of a different arrangement of the sensing masses, here designated by 16a', 16b', of the corresponding elastic supporting elements, here designated by 20', and of the sensing electrodes. FIG. 3, for simplicity of illustration, regards the case of a uniaxial gyroscope, capable of detecting pitch angular velocities $\vec{\Omega}_x$ about the first horizontal axis x.

In detail, the elastic supporting elements 20' are positioned at an end portion 31 of the corresponding sensing mass 16a', 16b', in particular the end portion having a smaller internal radius, i.e., being radially more internal, with respect to the center O (or, equivalently, having a smaller extension along the second horizontal axis y), instead of extending in an intermediate position with respect to the sensing mass 16a', 16b'. In addition, the elastic supporting elements 20' extend externally with respect to the respective sensing mass 16a', 16b', on opposite sides thereof, towards internal sides of the respective opening 9a', 9b' (which in this case has dimensions sufficiently greater than those of the corresponding sensing mass, for accommodating the same elastic supporting elements). The axis of rotation defined by the elastic supporting elements 20' extends, within the respective sensing mass, only through the aforesaid end portion 31.

Each sensing mass 16a', 16b' hence extends in cantilever fashion above the substrate 2a, starting from the corresponding elastic supporting elements 20', and extends substantially throughout its width (with respect to the first horizontal axis x), on just one side of the same elastic supporting elements 20'. The sensing masses 16a', 16b' are hence constituted by a single main body (or bulk), here designated by 17', which is continuous and not interrupted internally by the elastic supporting elements 20', and extends on just one side of the same elastic supporting elements 20'.

A single sensing electrode, here designated by 32, is associated to each sensing mass 16a', 16b'; the sensing electrode 32 extends underneath the corresponding sensing mass, and has dimensions and an extension substantially corresponding to those of the same sensing mass (in particular to its bulk 17'). For example, the sensing electrode 32 has a substantially trapezoidal geometry in plan view.

Figure 2:
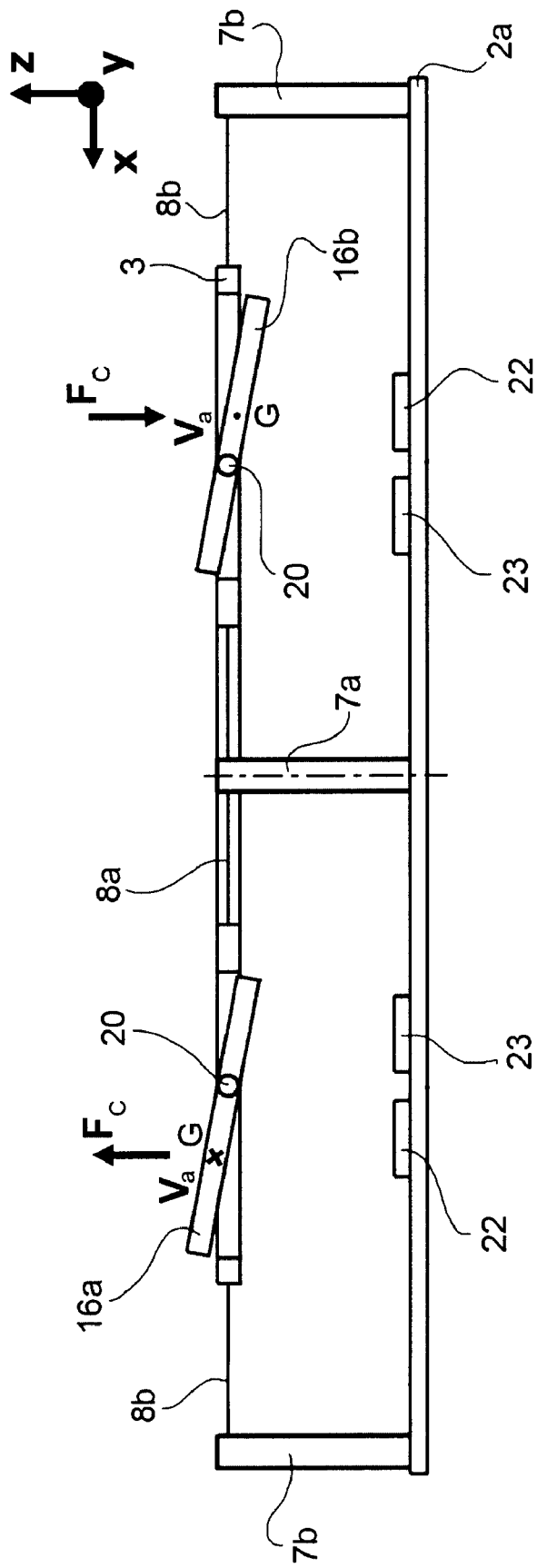
FIG. 2 shows a schematic lateral cross-sectional view of parts of the gyroscope of FIG. 1, in the presence of a Coriolis force.

Once again, the sensing masses 16a', 16b' are arranged in a symmetrical way with respect to the second horizontal axis y so that the corresponding center of gravity G' is positioned on opposite sides of the corresponding elastic supporting elements 20' with respect to the first horizontal axis x. In use, the Coriolis force $F_C$ deriving from the application of the pitch angular velocity $\vec{\Omega}_x$ causes rotation of the sensing masses 16a'-16b' about the respective elastic supporting elements 20' (reference may once again be made, by analogy, to FIG. 2), operating in such a way that one sensing mass 16a' moves away from the respective sensing electrode 32, and the other sensing mass 16b' undergoes a corresponding approach to the respective sensing electrode 32.

The present applicant has realized that, with an appropriate sizing of the elastic supporting elements 20', it is possible to leave the natural frequency of the sensing masses 16a', 16b' unvaried. Given the same natural frequency, the arrangement in cantilever fashion of the sensing masses 16a', 16b' considerably increases the distance of the center of gravity G' from the axis of rotation and the arm $b_C'$ of the Coriolis force $F_C$ (as compared to a traditional solution, with the elastic supporting elements in an intermediate position with respect to the same sensing masses), and hence displacement of the sensing masses 16a', 16b' due to application of the angular velocity $\vec{\Omega}_x$. Consequently, a considerable increase in the sensitivity of the gyroscope 30 in the detection of the angular velocities is obtained.

Figure 1:
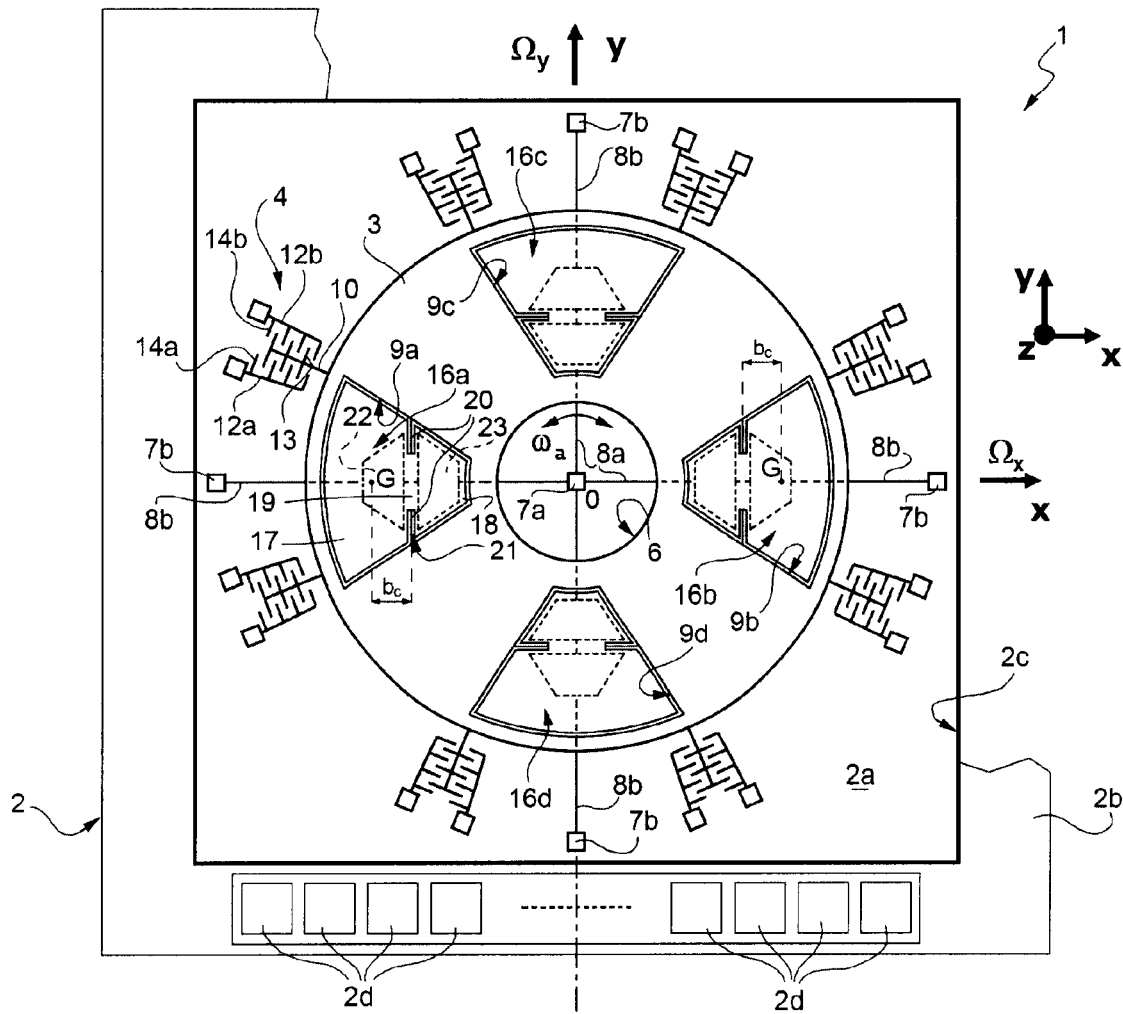
FIG. 1 shows a schematic top plan view of a microelectromechanical gyroscope, of a known type.

In addition, it is possible to show that the single sensing electrode 32 can have an area greater than the sum of the areas of the two sensing electrodes 22, 23, provided, in differential configuration, in the traditional solution of FIG. 1, guaranteeing a further increase in sensitivity (given that the value of the capacitance of the sensing capacitor is evidently proportional to the surface of the electrodes).

Even though the single sensing mass 16a', 16b', no longer has associated thereto a pair of sensing electrodes in differential configuration, the differential detection scheme, and the advantages notoriously associated thereto, is in any case maintained in the overall system constituted by the pair of sensing masses 16a', 16b'. Accordingly, the differential scheme makes it once again possible to guarantee the possibility of rejecting undesirable accelerations.

The present applicant has realized that the use of a single sensing electrode 32 associated to each sensing mass 16a', 16b', may have a drawback in that the pair of sensing masses are no longer completely insensitive to the acceleration of gravity. This implies that the sensitivity of the gyroscope 30 does not remain exactly constant, if the gyroscope 30 is kept upright or turned upside down with respect to a horizontal plane (the plane of the sensor xy). In fact, when the gyroscope 30 is kept upright (i.e., with the vertical axis z having a direction opposite to the force of gravity), the force of gravity causes a same approach of the two sensing masses 16a', 16b' towards the respective sensing electrode 32, with a decrease in the average gap of both of the sensing capacitors. This entails an equal increase of capacitance of both of the sensing capacitors and consequently an increase of sensitivity of the gyroscope 30. Likewise, with the gyroscope 30 set upside down (i.e., with the vertical axis z having the same direction as the force of gravity), the average gap between the sensing electrodes 32 and the corresponding sensing mass 16a', 16b' increases, and the sensitivity of detection decreases.

However, the present applicant has also verified that an adequate sizing of the sensing masses 16a', 16b', for example, in terms of geometry and natural frequency thereof, makes it possible to keep the sensitivity variation due to the presence of gravity within widely acceptable values (for example, equal to 1% or 2%), which does not imply problems for proper operation of the gyroscope 30.

Figure 4:
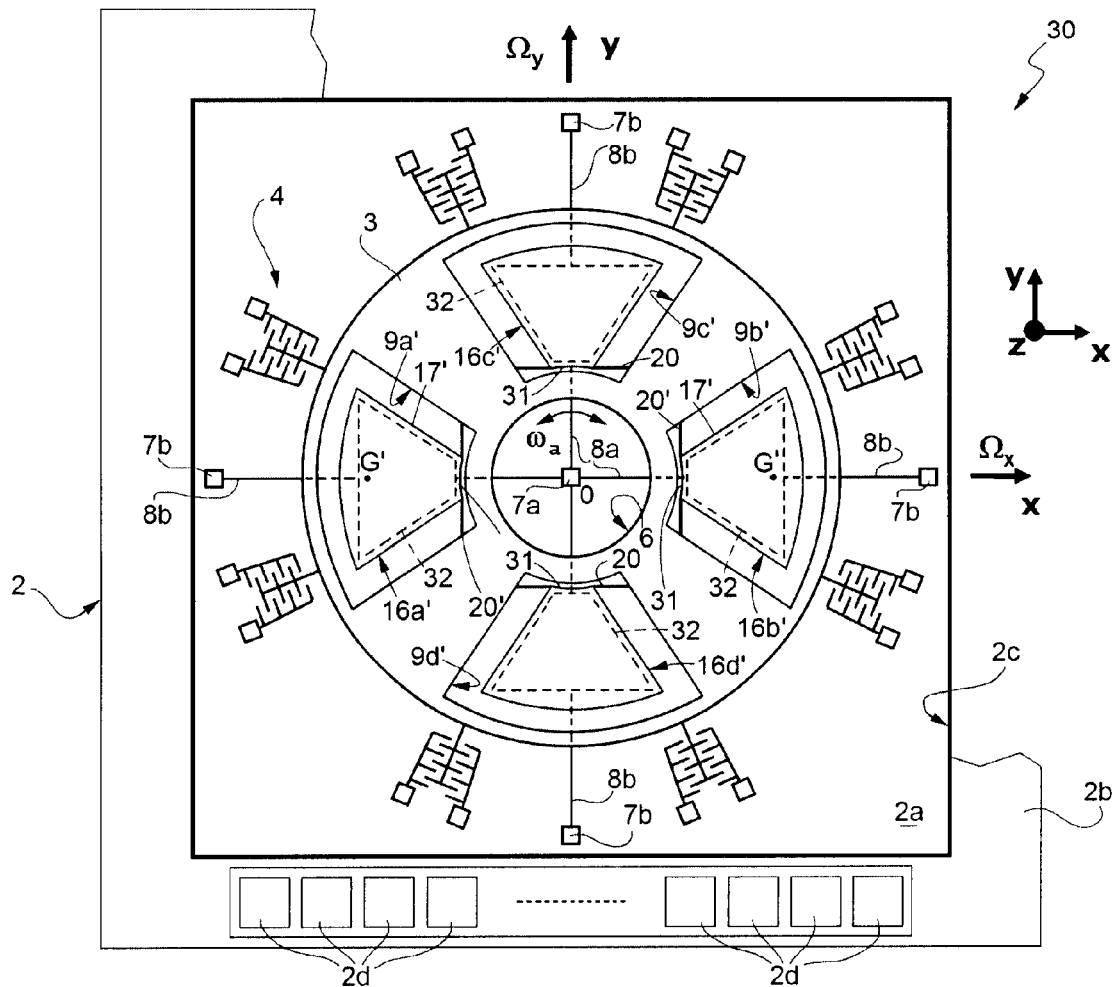
FIG. 4 shows a schematic top plan view of a microelectromechanical gyroscope in accordance with a second embodiment of the present disclosure.

FIG. 4 shows a gyroscope 30 of a biaxial type, capable of detecting pitch angular velocities $\vec{\Omega}_x$ about the first horizontal axis x, and also roll angular velocities $\vec{\Omega}_y$ about the second horizontal axis y.

In this case, the gyroscope 30 further comprises the second pair of sensing masses 16c', 16d', aligned along the second horizontal axis y. In a way altogether similar to what has been described previously for the first pair of sensing masses 16a', 16b', each of the sensing masses 16c', 16d' of the second pair extends in cantilever fashion from the respective elastic supporting elements 20', which are arranged at an end portion 31 thereof (once again the end portion with smaller radius and with smaller extension along the first horizontal axis x).

A further aspect of the present disclosure (see FIG. 5), envisages a different arrangement of the sensing masses 16a'-16d', aimed at obtaining a further increase in the sensitivity of detection of the angular velocities and in general in the efficiency of the gyroscope 30.

In detail, the sensing masses 16a', 16b' of the first pair are in this case aligned in a first diametric direction $x_1$, inclined with respect to the first horizontal axis x of the die 2 by an inclination angle α (considered in a counterclockwise direction), the value of which is preferably 45° (but which, for specific design requirements, can be, for example, comprised between 40° and 50°. Likewise, the sensing masses 16c', 16d' of the second pair are aligned in a second diametric direction $x_2$, substantially orthogonal to the first diametric direction $x_1$, and inclined with respect to the first horizontal axis x by the same angle of inclination a (considered in this case in an opposite direction, namely clockwise). The sensing masses 16a'-16d' are consequently aligned in respective diametric directions, which are inclined with respect to the pitch and roll axes, applied about which are the pitch angular velocity $\vec{\Omega}_x$ and the roll angular velocity $\vec{\Omega}_y$, and also inclined with respect to the sides of the die 2 (and to the horizontal axes x, y). In addition, each of the sensing masses 16a', 16b', of the first pair is symmetrical to a corresponding sensing mass 16d', 16c' of the second pair, with respect to the axis of symmetry of the die pads 2d (coinciding with the second horizontal axis y).

The present applicant has found that the aforesaid arrangement of the sensing masses 16a'-16d' enables a series of advantages to be obtained, amongst which a simplified connection of the corresponding sensing electrodes 32 towards the die pads 2d.

In particular, a first processing channel in the electronic read interface and corresponding electrical connections to the connection pads 2d are associated to the first pair of sensing masses 16a', 16b', whilst to the second pair of sensing masses 16c', 16d' are associated a second distinct processing channel in the same electronic read interface and corresponding electrical connections to the respective connection pads 2d.

Figure 5:
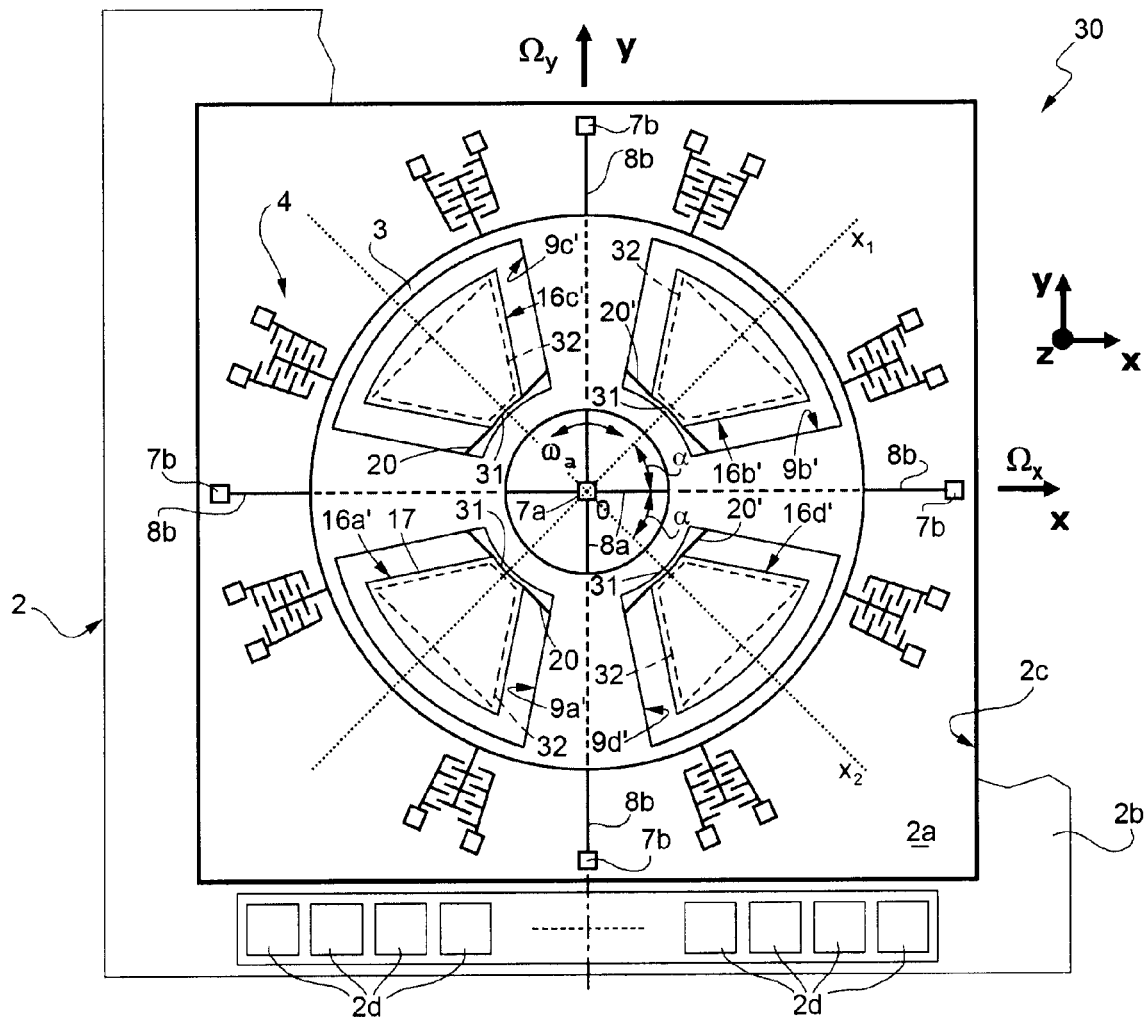
FIG. 5 shows a schematic top plan view of a microelectromechanical gyroscope according to a further embodiment of the present disclosure.

The present applicant has found that the arrangement described in FIG. 5 for the sensing masses 16a'-16d' with respect to the connection pads 2d enables a substantial symmetry of the electrical connections to said connection pads 2d to be obtained for the two processing channels (the two pairs of sensing masses are in fact arranged in an altogether symmetrical way with respect to the axis of symmetry of the connection pads 2d). The symmetry of the electrical connections enables, as it is known, considerable advantages to be obtained in terms of uniformity in the electrical characteristics (for example, in terms of active and parasitic capacitances, or leakage currents) and robustness to the parameter spread resulting from the manufacturing process.

Furthermore, the aforesaid arrangement of the sensing masses 16a'-16d' makes it possible to optimize exploitation of the space available in the gyroscope for detection of the angular velocities. The area available for providing the detection structures, coinciding with the open region 2c defined by the frame 2b of the die 2, usually has a square shape (as is shown in FIGS. 3-5) or a rectangular shape. The arrangement of the sensing masses 16a'-16d' in directions inclined with respect to the sides of the frame 2b and to the horizontal axes x, y enables (in a way not illustrated) increase in the dimensions and maximization of the sensitivity of the sensing masses, exploiting for detection the areas at a greater distance from the driving axis of rotation.

In addition, the aforesaid arrangement of the sensing masses 16a'-16d' makes it possible to obtain, using an appropriate configuration of the electronic read interface, a further increase in the sensitivity of the gyroscope 30. In fact, the gyroscope 30 shown in FIG. 5 has the peculiarity of having the axes of detection in the plane of the sensor xy (coinciding with the first and second diametric directions $x_1$, $x_2$ of alignment of the sensing masses 16a'-16d') inclined by the angle a with respect to the horizontal axes x and y about which the pitch angular velocity $\vec{\Omega}_x$ and the roll angular velocity $\vec{\Omega}_y$ act. Instead of envisaging assembly of the die 2 rotated through a corresponding angle α at the package or board level, which would evidently make it possible to re-orient the axes of detection according to the original pitch and roll directions (i.e., the horizontal axes x and y), a further aspect of the present disclosure envisages to suitably combine, at the electronic read interface level, the detection signals coming from the sensing masses 16a'-16d'. In particular, the detection signals are combined so as to re-obtain, starting from the capacitive variations associated to the displacements of the first sensing masses 16a'-16d', voltage outputs corresponding to the original pitch and roll directions (i.e., to the horizontal axes x and y). It is possible to show, with simple geometrical considerations, that by summing the contributions of all of the four sensing masses referred to the same angular velocity, it is possible to obtain a global increase in the sensitivity of the gyroscope 30 equal to a factor $\sqrt{2}$.

Figure 6:
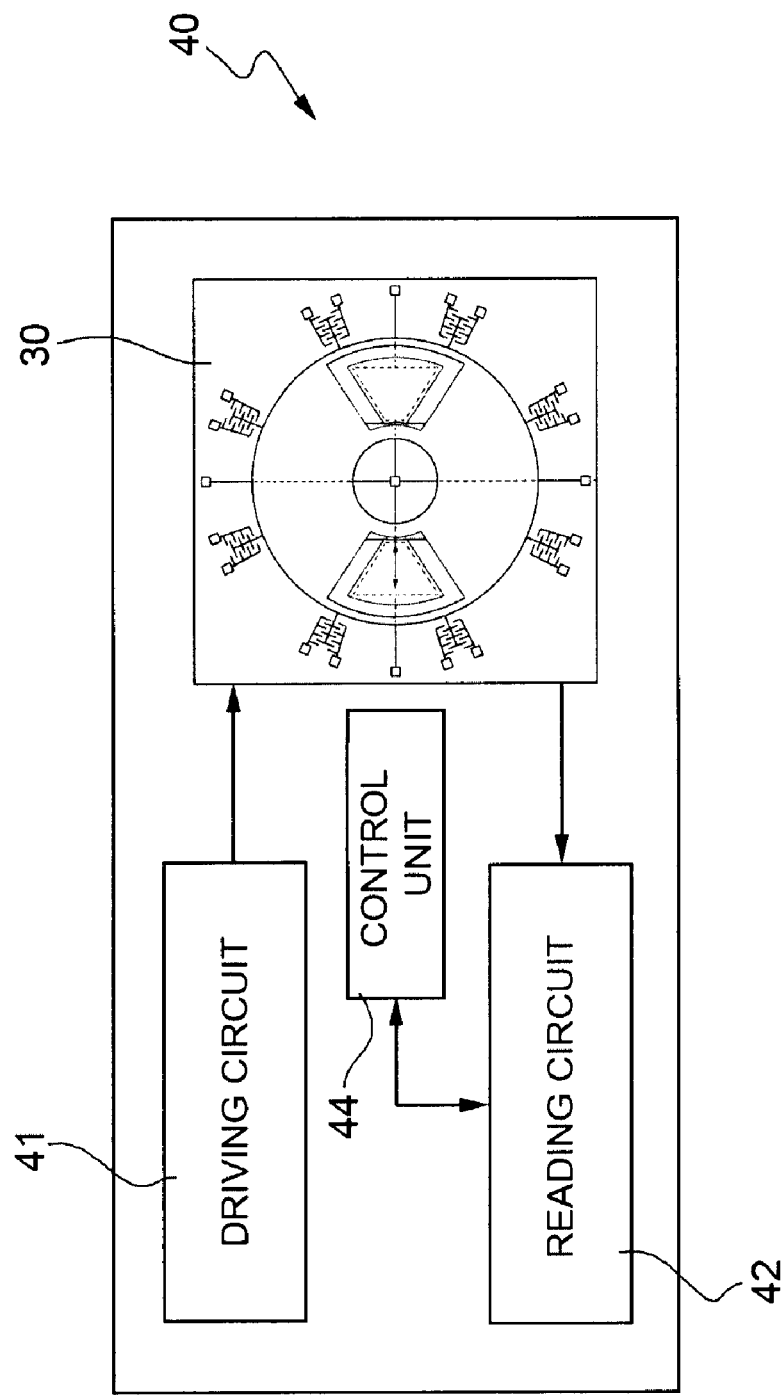
FIG. 6 shows a simplified block diagram of an electronic device equipped with the microelectromechanical gyroscope according to an aspect of the disclosure.

FIG. 6 illustrates an electronic device 40 comprising the microelectromechanical gyroscope 30 described previously. The electronic device 40 can advantageously be used in a plurality of electronic systems, for example, in inertial navigation systems, in automotive systems or in systems of a portable type, such as, for example: a PDA (Personal Digital Assistant); a portable computer; a cell phone; a digital audio player; a photographic camera or a camcorder; or further systems capable of processing, storing, transmitting and receiving signals and information.

The electronic device 40 further comprises: a driving circuit 41, operatively coupled to the driving assembly 4 for imparting the driving movement on the driving mass 3, and supplying biasing signals to the microelectromechanical structures; a read circuit 42, operatively coupled to the sensing electrodes 22, 23 of the first and second sensing masses, for detecting the amount of displacement of the same sensing masses and determining the angular velocities acting on the structure; and an electronic control unit 44, connected to the read circuit 42, and designed to supervise general operation of the electronic device 40, for example, on the basis of the angular velocities detected and determined. In particular, the read circuit 42 includes the aforesaid electronic read interface, designed to suitably combine the output signals corresponding to the individual first sensing masses, in order to increase the sensitivity of detection, as previously described.

The advantages of the microelectromechanical gyroscope according to the present disclosure are clear from the foregoing description.

In any case, it is emphasized that the arrangement of the sensing masses, suspended in cantilever fashion from the respective elastic supporting elements (arranged in an area corresponding to an end portion thereof), enables a considerable increase of the arm of the Coriolis force and the value of the resultant torque, in such a way as to enable a considerable increase of sensitivity in detection of angular velocities.

In addition, this arrangement enables positioning, underneath each sensing mass, of a single sensing electrode, of greater dimensions as compared to traditional solutions, a fact that enables a further increase in the sensitivity of the gyroscope 30. Even though the presence of a single sensing electrode renders the sensitivity gravity-dependent, it has been shown that an appropriate sizing of the structure makes it possible to maintain the resulting variation of sensitivity within substantially negligible values. Possibly, said variations can also be appropriately compensated for by the read electronics associated to the gyroscope 30.

In addition, the arrangement of the sensing masses in directions of alignment inclined with respect to the horizontal axes makes it possible to optimize exploitation of the area available for detection, further increase the sensitivity of the sensor, and improve uniformity of the electrical characteristics and robustness of the system to disturbance.

Finally, it is clear that modifications and variations can be made to what has been described and illustrated herein, without thereby departing from the scope of the present disclosure.

In particular, when the geometry and dimensions of the sensing masses 16a'-16d' so allow, the elastic supporting elements 20' can be set within, instead of extending outside, the sensing masses. In addition, it is evident that different geometries can be provided for the sensing masses 16a'-16d', for example, a rectangular geometry, a trapezoidal geometry, or a generally rhomboidal geometry.

Figure 7:
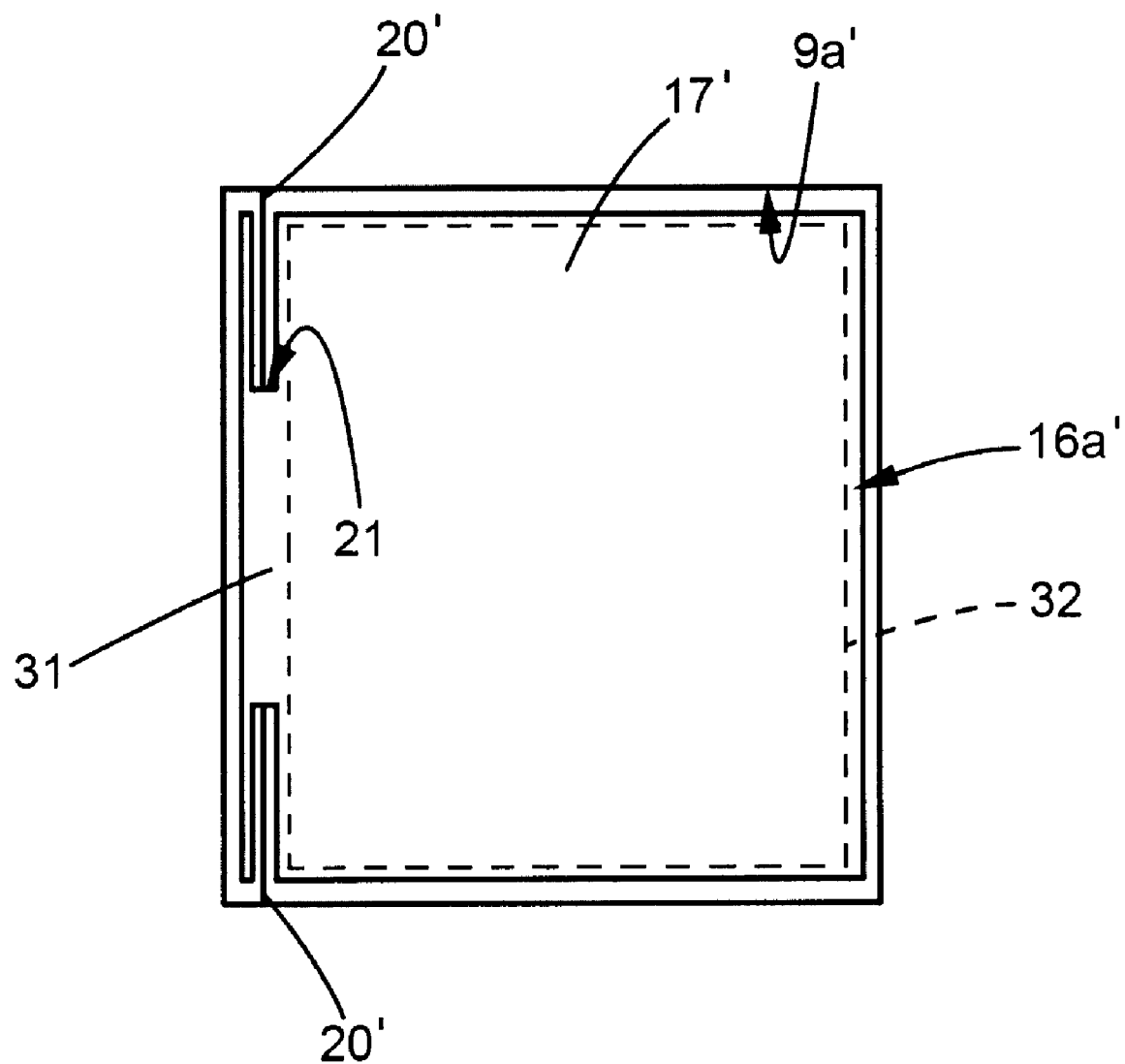
FIGS. 7-9 show schematic top plan views of embodiments of a sensing mass of the gyroscope of FIGS. 3-5.

In detail, as is shown in FIG. 7, which regards purely by way of example a sensing mass 16a' having a rectangular geometry (FIG. 7 shows for reasons of clarity only one sensing mass, but it is clear that similar considerations apply to the other sensing masses 16b'-16d' in the structures described previously), the elastic supporting elements 20' extend in this case in recesses 21 obtained within the sensing mass in an area corresponding to the end portion 31 thereof (in particular, the end that is radially more internal with respect to the center O). In this case, it is evident that the elastic supporting elements 20' (and the recesses 21) divide the sensing mass 16a' into a bulk 17' (having substantially the same overall dimensions of the sensing mass) and a portion of dimensions altogether negligible with respect to the bulk 17'.

Figure 8:
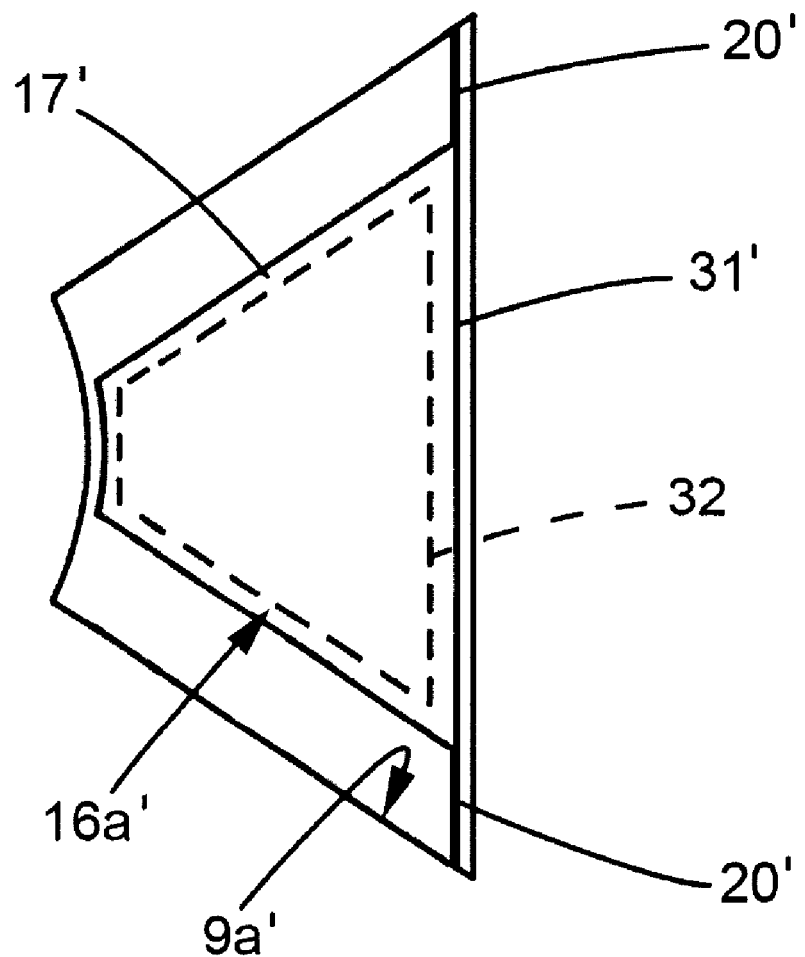

In a variant embodiment of the present disclosure (see FIG. 8), the elastic supporting elements 20' extend at the opposite end of the sensing mass 16a', i.e., in an area corresponding to the end portion (here designated by 31') radially more external with respect to the center O, or, in the specific case of a sensing mass having a trapezoidal conformation (as shown in the same FIG. 8), having a greater extension along the second horizontal axis y.

Figure 9:
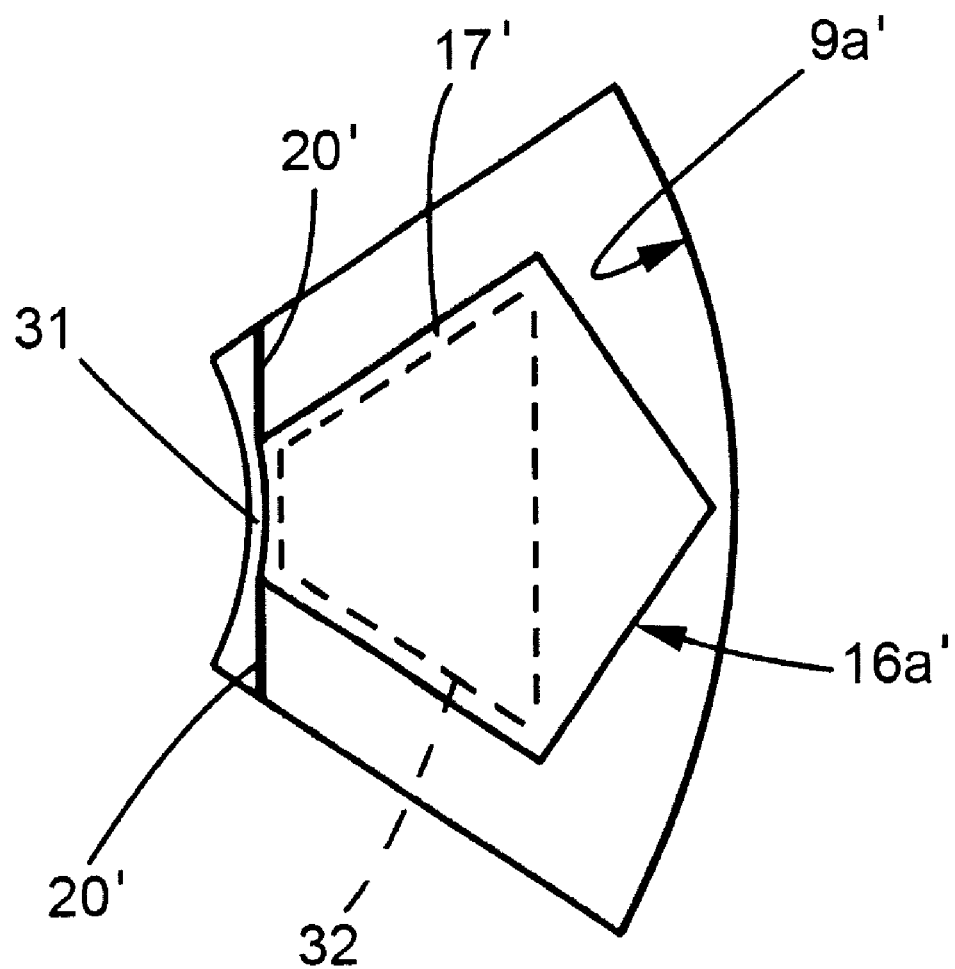

FIG. 9 shows a further geometrical variant of the sensing mass 16a', having a generally rhomboidal conformation (with the elastic supporting elements 20' extending externally with respect to the sensing mass, in an area corresponding to the end portion 31 that is radially more internal with respect to the center O).

In addition, it is evident that the configuration described of the sensing masses can advantageously be provided also for a triaxial gyroscope, i.e., one that is sensitive also to yaw angular velocities (and provided for this purpose with two further sensing masses sensitive to Coriolis forces acting in the plane of the sensor xy—see the aforesaid patent applications for further details).

The microelectromechanical structure, in its simplest embodiment, can possibly comprise just one sensing mass, with the disadvantage of not being able to reject linear accelerations in the direction of detection.

In a per-se known manner, the displacement of the sensing masses can be determined with a technique different from the capacitive one, for example, by detection of a magnetic force.

The torque for causing oscillation of the driving mass with rotary movement can be generated in a different way, for example, by means of parallel-plate electrodes, or else by magnetic actuation. In addition, the driving motion may even not be rotary, but of a translational type.

More in general, it is evident that the configuration of some structural elements of the gyroscope 30 can be different. For example, the driving mass 3 can have a shape different from the circular one, for example, a generally closed polygonal shape, as likewise the shape of the frame 2b of the die 2 can be different. Alternatively, it is possible to envisage a different arrangement of the elastic anchorage elements 8a, 8b of the driving mass 3 (provided that it is able to guarantee the decoupling of the driving mass from the detection motion). Finally, different conformations and dimensions of the sensing electrodes associated to the sensing masses may be envisaged.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated microelectromechanical structure, comprising:
   a substrate;
   first elastic anchorage elements fixed to the substrate;
   a driving mass anchored to the substrate via the first elastic anchorage elements, and configured to move in a plane with a driving movement, the driving mass having a first opening;
   first elastic supporting elements coupled to the driving mass in the first opening, the first elastic supporting elements having longitudinal extensions; and
   a first sensing mass, suspended inside the first opening of the driving mass, and coupled to said driving mass via the first elastic supporting elements, the first sensing mass being fixed with respect to said driving mass in said driving movement and being configured to perform a detection movement of rotation out of said plane, in response to a rotation of the structure at a first angular velocity;
   wherein said first elastic supporting elements are coupled to said first sensing mass at an end portion of the first sensing mass, a first axis of rotation of said detection movement extends through the end portion of the first sensing mass and through the longitudinal extensions the first elastic supporting elements.

2. The structure according to claim 1 wherein said driving movement is a rotation about an axis that is transverse to the plane, and said first elastic supporting elements extend inside said first opening between said driving mass and said end portion; said elastic first anchorage elements and said first elastic supporting elements being configured so that said driving mass is decoupled from said first sensing mass during said detection movement.

3. The structure according to claim 1, further comprising a single sensing electrode configured to form a sensing capacitor with the first sensing mass; said sensing electrode being on said substrate and underneath said first sensing mass.

4. The structure according to claim 3 wherein said first sensing mass extends in cantilever fashion from said first elastic supporting elements, and has a main body entirely on one side of said axis of rotation; and wherein said sensing electrode is underneath said main body.

5. The structure according to claim 4 wherein said sensing electrode has dimensions substantially coinciding with dimensions of said main body.

6. The structure according to claim 1, comprising:
   a second opening in the driving mass;
   second elastic supporting elements;
   a second sensing mass in the second opening of the driving mass and coupled to the driving mass by the second elastic supporting elements, the second sensing mass being operatively coupled to said first sensing mass and configured to form a first pair of sensing masses, the first pair of sensing masses being aligned in a first direction of said plane; wherein respective end portions of said first and second sensing masses correspond to radially more internal sides of said first and second sensing masses, respectively, with respect to a center of rotation of said driving mass.

7. The structure according to claim 6 wherein said first elastic supporting elements define said first axis of rotation of said detection movement and the second elastic supporting elements define a second axis of rotation of said detection movement, the second axis of rotation extends through the end portion of the second sensing mass and through the second elastic supporting elements; and wherein said first and second sensing masses of said first pair extend in cantilever fashion from the first and second elastic supporting elements, respectively, and are positioned on opposite sides of said first elastic supporting elements along said first direction.

8. The structure according to claim 6, of a biaxial type, further comprising:
   a third and a fourth openings in the driving mass;
   third and fourth elastic supporting elements; and
   third and fourth sensing masses that form a second pair of sensing masses, suspended inside the third and fourth openings, respectively, and coupled to, said driving mass via the third and fourth elastic supporting elements, respectively, the second pair of sensing masses being aligned in a second direction; said third and fourth elastic supporting elements being coupled to respective end portions of the second pair of sensing masses a third and fourth axes of rotation of respective detection movements extends through the end portions of the second pair of sensing masses, respectively, and through the third and fourth elastic supporting elements, respectively.

9. The structure according to claim 8, further comprising:
   a die, that includes:
      the substrate; and
      a frame configured to define a sensing region and having a first side extending along a first axis of the plane;
      wherein said first direction and second direction have non-zero inclinations of opposite signs with respect to said first axis.

10. The structure according to claim 9 wherein said first direction is inclined with respect to said first axis by an angle, and said second direction is inclined by the same angle, on the opposite side with respect to said first axis.

11. The structure according to claim 10 wherein said angle has a value substantially equal to 45°.

12. The structure according to claim 9, further comprising a plurality of die pads extending along said first side of said frame in a symmetrical way with respect to a second axis of the plane; wherein the first and second sensing masses of said first pair is set symmetrically to a corresponding one the third and fourth sensing masses of said second pair with respect to said second axis.

13. The structure according to claim 9 wherein said rotation of the structure at the first angular velocity is applied in use about said first axis, coinciding with a first axis of detection of said structure.

14. The structure according to claim 1 wherein said driving mass defines a central empty space, the structure further comprising:
   a first anchorage set substantially at a center of said empty space and fixed to the substrate;
   the first elastic anchorage elements extending inside said empty space and between the driving mass and the first anchorage;
   a plurality of second anchorages set on the outside of said driving mass and fixed to the substrate; and
   second elastic anchorage elements extending between the driving mass and the second anchorages, respectively;
   wherein said first elastic supporting elements and said first and second elastic anchorage elements are configured so that said driving mass is decoupled from said first sensing mass in said detection movement of rotation out of said plane.

15. The structure according to claim 1 wherein said first sensing mass has radial sector shapes.

16. An electronic device comprising:
   an integrated microelectromechanical structure, that includes:
      a substrate;
      elastic anchorage elements fixed to the substrate;
      a driving mass anchored to the substrate via the elastic anchorage elements, the driving mass having an opening, and being configured to move in a plane with a driving movement;
      elastic supporting elements, the elastic supporting elements having longitudinal extensions; and
      a first sensing mass, suspended inside the opening of the driving mass and
   coupled to said driving mass via the elastic supporting elements, the first sensing mass being fixed with respect to said driving mass in said driving movement and configured to perform a detection movement of rotation out of said plane, in response to a rotation of the structure at a first angular velocity;
      wherein said elastic supporting elements are coupled to said first sensing mass at an end portion of the first sensing mass, an axis of rotation of said detection movement extends through, the end portion of the first sensing mass and through the longitudinal extensions of the elastic supporting elements; and
   a read stage, operatively coupled to said integrated microelectromechanical structure.

17. The electronic device of claim 16 wherein said driving movement is a rotation about an axis that is transverse to the plane, and said elastic supporting elements extend inside said opening between said driving mass and said end portion; said elastic anchorage elements and said elastic supporting elements being configured so that said driving mass is decoupled from said first sensing mass during said detection movement.

18. The electronic device of claim 16, further. comprising a single sensing electrode configured to form a sensing capacitor with the first sensing mass; said sensing electrode being on said substrate and underneath said first sensing mass.

19. The electronic device of claim 18 wherein said first sensing mass extends in cantilever fashion from said elastic supporting elements, and has a main body entirely on one side of said axis of rotation; and wherein said sensing electrode is underneath said main body.

20. The electronic device of claim 19 wherein said sensing electrode has dimensions substantially coinciding with dimensions of said main body.

21. The electronic device of claim 16, comprising a second sensing mass operatively coupled to said first sensing mass, and forming therewith a first pair of sensing masses, aligned in a first direction of said plane; wherein a respective end portions of said first and second sensing masses correspond to a radially more internal sides of said first and second sensing masses, respectively, with respect to a center of rotation of said driving mass.

22. A method of forming an integrated microelectromechanical structure, comprising:
  attaching elastic anchorage elements to a substrate;
  anchoring a driving mass to the substrate via the elastic anchorage elements, the driving mass being configured to move in a plane with a driving movement;
  forming an opening in the driving mass;
  forming elastic supporting elements having longitudinal extensions;
  suspending a first sensing mass inside the opening in the driving mass; and
  coupling the first sensing mass to the driving mass via the elastic supporting elements, the first sensing mass being fixed with respect to the driving mass in the driving movement and the first sensing mass being configured to perform a detection movement of rotation out of the plane, in response to a rotation of the structure at a first angular velocity, the coupling of the first sensing mass including:
    coupling the elastic supporting elements to an end of the first sensing mass, an axis of rotation of the detection movement extends through the end portion of the first sensing mass and through the longitudinal extensions of the elastic supporting elements.

23. The method of claim 22 wherein the elastic anchorage elements and the elastic supporting elements are configured so that the driving mass is decoupled from the first sensing mass during the detection movement, and wherein the driving movement is a rotation about an axis that is transverse to the plane.

24. The method of claim 22, further comprising
  forming a sensing capacitor with the first sensing mass by coupling a single sensing electrode to the first sensing mass, the sensing electrode being on the substrate and underneath the first sensing mass.

25. The method of claim 24 wherein the first sensing mass extends in cantilever fashion from the elastic supporting elements, and has a main body entirely on one side of the axis of rotation; and wherein the sensing electrode is underneath the main body.

26. The method of claim 25 wherein the sensing electrode has dimensions substantially corresponding with dimensions of the main body.

27. The method of claim 22, further comprising:
  forming a second sensing mass operatively coupled to the first sensing mass, wherein the first and second sensing masses form a first pair of sensing masses, aligned in a first direction of the plane and respective end portions of the first and second sensing masses correspond to radially more internal sides of the first and second sensing masses, respectively, with respect to a center of rotation of the driving mass.

* * * * *

UNITED STATES PATENT AND TRADEMARK OFFICE
CERTIFICATE OF CORRECTION

PATENT NO. : 8,312,769 B2
APPLICATION NO. : 12/626442
DATED : November 20, 2012
INVENTOR(S) : Luca Coronato et al.

Page 1 of 1

It is certified that error appears in the above-identified patent and that said Letters Patent is hereby corrected as shown below:

In the Claims:

Column 14, Lines 25 and 26:
"driving mass and
coupled to said driving mass via the elastic supporting" should read, --driving mass and coupled to said driving mass via the elastic supporting--.

Column 14, Line 47:
"18. The electronic device of claim 16, further. comprising" should read, --18. The electronic device of claim 16, further comprising--.

Signed and Sealed this
Twenty-third Day of April, 2013

Teresa Stanek Rea
*Acting Director of the United States Patent and Trademark Office*